(No Model.)

W. RUBY.
CARRIAGE.

No. 248,352. Patented Oct. 18, 1881.

WITNESSES.
Oscar H. Metzner
Frank Pardow

INVENTOR.
William Ruby

UNITED STATES PATENT OFFICE.

WILLIAM RUBY, OF LOUISVILLE, KENTUCKY.

CARRIAGE.

SPECIFICATION forming part of Letters Patent No. 248,352, dated October 18, 1881.

Application filed July 18, 1881. (No model.)

*To all whom it may concern:*

Be it known that I, WILLIAM RUBY, of the city of Louisville, State of Kentucky, have invented a new and useful Improvement in Carriages; and I do hereby declare that the following is a full, clear, and exact description of the construction and operation of the same, reference being had to the accompanying drawings, forming a part of this specification.

My invention relates to an improvement in carriages; and its object is to convert at pleasure, by the means hereinafter described, the front detachable partition of an inclosed carriage into a half-open front, and at the same time dividing the front seat into two sections or seats—one for the driver and one for the passenger. I accomplish this object by the means illustrated in the accompanying drawings, in which—

Figure 1:
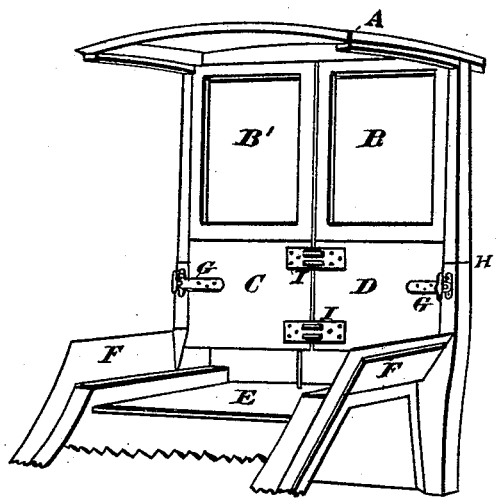
Figure 2:
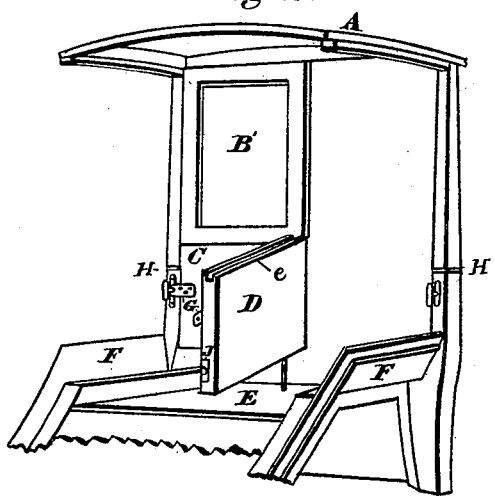

Figure 1 is a perspective view of the front of a carriage top and seat, showing my invention applied with the partition closed; and Fig. 2, a similar view, showing the partition open and the front seat separated, as desired.

Similar letters refer to similar parts in both views.

A represents part of the top; B B', glass and frames of upper parts of front partition; C and D, the lower parts of the partition; E, bottom of, and F F sides of, front seat; G G, metal plates and set-screw; I I, hinges, and J bolt and slot to hold part D in place.

The upper parts of the partition, consisting of the glass and frames B B', are constructed in the usual manner to fit in grooves in the top and sides of the carriage, while their bottoms rest and slide in grooves e, formed in the lower partitions, C and D, all of said grooves being sufficiently wide to permit the said parts B B' to slide back of each other.

When it is desired to convert the closed front, as shown in Fig. 1, to the half-open front, as shown in Fig. 2, the part B is pushed back of B' over C, and the part D released from its fastenings (plate and set-screws or other suitable means) from the side pillar of the carriage, turned outward on hinges I, and fastened securely at the center of seat E by means of bolt J, which slides into a hole or slot properly constructed in the seat-bottom E. Thus the front of the carriage is made partly open, and the seat is divided into two parts— one for the driver and one for the passenger— and the passenger is enabled, if he desires, to face the inside of the carriage.

By means of the wide grooves, double set of fastening devices, and arrangement of the hinges, as shown in the drawings, it is obvious that the partition may be opened from the opposite side of the carriage—*i. e.*, the part B' may be slid back of B and the part C opened to divide the seat.

It will be seen, too, that by the construction and arrangement shown the entire partition may be removed, if desired.

As indicated at H, my invention is shown applied to a carriage provided with front pillars, which are made detachable by means of tenons, mortises, and set-screws, and by which the inclosed carriage can be converted into an open one, as described and claimed in my patent of February 8, 1881, and which features I therefore do not claim here; but What I desire to now claim and secure by Letters Patent is—

1. A carriage provided with an inclosed front partition, which is partly opened to divide the front seat into two seats or sections, substantially as described.

2. A carriage-partition consisting of the parts B, B', C, and D, with hinges and fastening devices, in combination with a carriage-top, substantially as described.

In testimony that I claim the foregoing I have hereunto set my hand this 7th day of July, 1881.

WILLIAM RUBY.

Witnesses:
 OSCAR A. METZNER,
 FRANK PARDON.